(12) United States Patent
Roeglin et al.

(10) Patent No.: US 8,585,004 B1
(45) Date of Patent: Nov. 19, 2013

(54) AIR RIDE SEAT PEDESTAL WITH INDEPENDENT HEIGHT ADJUSTMENT

(75) Inventors: Timothy J. Roeglin, Elkhart, IN (US);
Robert Cooling, Granger, IN (US);
Michael Pequignot, II, Fremont, IN (US)

(73) Assignee: Atwood Mobile Products LLC, Elkhart, IN (US)

( * ) Notice: Subject to any disclaimer, the term of this patent is extended or adjusted under 35 U.S.C. 154(b) by 144 days.

(21) Appl. No.: 13/235,039

(22) Filed: Sep. 16, 2011

Related U.S. Application Data

(63) Continuation-in-part of application No. 12/359,370, filed on Jan. 26, 2009, now abandoned.

(51) Int. Cl.
*F16M 13/00* (2006.01)

(52) U.S. Cl.
USPC ........... 248/421; 248/564; 267/131; 296/68.1

(58) Field of Classification Search
USPC .................. 248/157, 162.1, 421, 565, 588; 267/131, 136; 297/344.17
See application file for complete search history.

(56) References Cited

U.S. PATENT DOCUMENTS

| | | |
|---|---|---|
| 3,325,136 A | 6/1967 | Radke et al. |
| 3,356,413 A | 12/1967 | Radke |
| 3,558,094 A | 1/1971 | Radke et al. |
| 3,599,232 A | 8/1971 | Tabor |
| 3,638,897 A | 2/1972 | Harder, Jr. et al. |
| 3,727,974 A | 4/1973 | Swenson et al. |
| 3,787,025 A | 1/1974 | Sturhan |
| 3,826,457 A | 7/1974 | Huot de Longchamp |
| 3,874,626 A | 4/1975 | Gross et al. |
| 3,951,373 A | 4/1976 | Swenson et al. |
| 3,954,245 A | 5/1976 | Costin |
| 3,999,800 A | 12/1976 | Penzotti |
| 4,014,593 A | 3/1977 | Costin |
| 4,054,318 A | 10/1977 | Costin |
| 4,105,195 A | 8/1978 | Lamberts |
| 4,228,984 A | 10/1980 | Thompson et al. |
| 4,264,050 A | 4/1981 | Wahls |
| 4,397,440 A | 8/1983 | Hall et al. |
| 4,448,386 A | 5/1984 | Moorhouse et al. |

(Continued)

FOREIGN PATENT DOCUMENTS

| | | |
|---|---|---|
| EP | 912.396 | 12/1962 |
| EP | 961.999 | 6/1964 |

(Continued)

*Primary Examiner* — Gwendolyn Baxter
(74) *Attorney, Agent, or Firm* — Botkin & Hall, LLP

(57) ABSTRACT

An adjustable seat pedestal that allows a user to adjust the height of the seat without sacrificing ride quality. The seat pedestal has a top carrier onto which a seat is mounted and a base that is mounted to the floor of a vehicle. A scissor linkage is employed to allow movement of the carrier toward the base when force is applied through the seat to the carrier when the vehicle hits bumps and forces the user downward. An air bag biases the top carrier upward away from the base. As the upper ends of the scissor linkage move closer together by being pushed upward, a sliding end of the scissor linkage is restrained from movement inward and therefore, limits the maximum height of the pedestal. The pressure in the air bag may be varied which will not change the height above the maximum, but will change the ride quality.

7 Claims, 10 Drawing Sheets

(56) References Cited

U.S. PATENT DOCUMENTS

| | | | |
|---|---|---|---|
| 4,461,444 A | 7/1984 | Grassl et al. | |
| 4,681,292 A | 7/1987 | Thomas | |
| 4,709,896 A | 12/1987 | Wahls et al. | |
| 4,733,847 A | 3/1988 | Grassl | |
| 4,778,216 A | 10/1988 | Stupakis | |
| 4,809,944 A | 3/1989 | Smith et al. | |
| 4,822,094 A | 4/1989 | Oldfather et al. | |
| 4,856,763 A | 8/1989 | Brodersen et al. | |
| 4,880,201 A | 11/1989 | Hall et al. | |
| 4,913,482 A | 4/1990 | Hanai et al. | |
| 4,941,641 A | 7/1990 | Granzow et al. | |
| 4,946,145 A | 8/1990 | Kurabe | |
| 5,004,206 A | 4/1991 | Anderson | |
| 5,005,894 A * | 4/1991 | Nagata | 296/68.1 |
| 5,058,852 A | 10/1991 | Meier et al. | |
| 5,082,326 A | 1/1992 | Sekido et al. | |
| 5,112,018 A | 5/1992 | Wahls | |
| 5,169,112 A | 12/1992 | Boyles et al. | |
| 5,176,355 A | 1/1993 | Carter | |
| 5,222,709 A * | 6/1993 | Culley et al. | 248/421 |
| 5,253,853 A | 10/1993 | Conaway et al. | |
| 5,285,992 A * | 2/1994 | Brown | 248/421 |
| 5,346,170 A * | 9/1994 | Schmidt et al. | 248/550 |
| 5,358,305 A | 10/1994 | Kaneko et al. | |
| 5,542,638 A | 8/1996 | Smith | |
| 5,570,866 A | 11/1996 | Stephens | |
| 5,580,027 A * | 12/1996 | Brodersen | 248/564 |
| 5,582,385 A | 12/1996 | Boyle et al. | |
| RE35,572 E | 7/1997 | Lloyd et al. | |
| 5,651,585 A | 7/1997 | Van Duser | |
| 5,652,704 A | 7/1997 | Catanzarite | |
| 5,671,964 A | 9/1997 | DeRees et al. | |
| 5,735,509 A | 4/1998 | Gryp et al. | |
| 5,765,802 A | 6/1998 | Bostrom et al. | |
| 5,799,922 A | 9/1998 | Timms et al. | |
| 5,871,198 A | 2/1999 | Bostrom et al. | |
| 5,927,679 A | 7/1999 | Hill | |
| 5,950,977 A | 9/1999 | Proksch et al. | |
| 5,964,455 A | 10/1999 | Catanzarite et al. | |
| 5,975,508 A | 11/1999 | Beard | |
| 5,984,410 A | 11/1999 | Brodersen | |
| 6,059,253 A | 5/2000 | Koutsky et al. | |
| 6,098,000 A | 8/2000 | Long et al. | |
| 6,109,691 A | 8/2000 | Gray et al. | |
| 6,120,082 A | 9/2000 | Vandermolen | |
| 6,135,412 A | 10/2000 | Buehler | |
| 6,193,297 B1 | 2/2001 | Vandermolen | |
| 6,199,820 B1 | 3/2001 | Ritchie | |
| 6,202,972 B1 | 3/2001 | Manavi | |
| 6,237,889 B1 | 5/2001 | Bischoff | |
| 6,241,209 B1 | 6/2001 | Von Mayenburg et al. | |
| 6,257,663 B1 | 7/2001 | Swierczewski | |
| 6,264,163 B1 | 7/2001 | Ivarsson | |
| 6,286,819 B1 | 9/2001 | Ritchie et al. | |
| 6,354,556 B1 | 3/2002 | Ritchie et al. | |
| 6,371,456 B1 | 4/2002 | Ritchie et al. | |
| 6,467,748 B1 | 10/2002 | Schick et al. | |
| 6,550,740 B1 | 4/2003 | Burer | |
| 6,616,116 B1 | 9/2003 | Rochau et al. | |
| 6,616,117 B2 | 9/2003 | Gryp et al. | |
| 6,719,258 B2 | 4/2004 | Bryngelson et al. | |
| 6,866,236 B2 | 3/2005 | Mullinix et al. | |
| 7,152,839 B2 | 12/2006 | Mullinix et al. | |
| 7,168,671 B2 | 1/2007 | Bostrom et al. | |
| 7,229,133 B2 | 6/2007 | Maddelein et al. | |
| 7,246,836 B2 | 7/2007 | Hahn | |
| 8,118,287 B2 * | 2/2012 | Schordine | 267/131 |
| 2006/0214458 A1 | 9/2006 | Meyer et al. | |
| 2006/0237885 A1 | 10/2006 | Paillard et al. | |
| 2006/0278805 A1 | 12/2006 | Haller | |
| 2007/0007790 A1 | 1/2007 | Hahn | |
| 2007/0035167 A1 | 2/2007 | Meyer | |
| 2007/0096496 A1 | 5/2007 | Saberan et al. | |
| 2007/0278377 A1 | 12/2007 | Moorhouse et al. | |
| 2007/0284927 A1 | 12/2007 | Therer et al. | |
| 2008/0047770 A1 | 2/2008 | Breed et al. | |
| 2008/0088165 A1 | 4/2008 | Deml | |

FOREIGN PATENT DOCUMENTS

| | | |
|---|---|---|
| EP | 1.208.051 | 1/1968 |
| EP | 1.160.185 | 4/1968 |
| EP | 1.282.213 | 7/1972 |
| EP | 1357414 | 6/1974 |
| EP | 1.601.370 | 10/1981 |
| EP | 1 050 428 A1 | 11/2000 |

* cited by examiner

AIR RIDE SEAT PEDESTAL WITH INDEPENDENT HEIGHT ADJUSTMENT

CROSS REFERENCE TO RELATED APPLICATIONS

This application is a continuation-in-part claiming the benefit of U.S. Utility patent application Ser. No. 12/359,370; filed Jan. 26, 2009, now abandoned the disclosure of which is hereby incorporated by reference.

BACKGROUND OF THE INVENTION

The invention relates generally to an air ride seat pedestal for heavy trucks, busses, RVs, and the like that includes a height adjustment that is independent of the air cushioning assembly upon which the seat is supported.

Seats for heavy vehicles, including seats that are supported by an air ride assembly, are available in the marketplace. Such air ride assemblies may typically include an air bag or balloon in combination with a piston/cylinder unit connected between the base and the top of the pedestal upon which the seat is mounted. The air bag typically provides cushioning to the seat pedestal and its occupant, while the cylinder unit is geared more toward dampening rebound forces delivered from the ground surface upward through the vehicle's frame during travel. To adjust the height of the seat requires the inflation or deflation of the air bag.

The present systems using an air bag provides inadequate adjustments to accommodate various users of the seat pedestal. To raise the height of a traditional air bag pedestal higher pressure is pumped into the air bag to raise the height. The maximum height that the pedestal may raise to is limited to one maximum position that corresponds to the maximum height the frame around the air bag will rise, or the maximum height is limited by the maximum extension of the air bag. Therefore, maximum height may mean a stiffer ride due to higher pressure in the air bag. This may present a problem for a relatively short individual because he would have to tolerate a softer ride due to the low pressure necessary to lower the seat. Within a traditional seat there is not a way to limit the height of the air bag to a lower height than its maximum height, yet have the air pressure in the air bag corresponding to the maximum height. Thus, in a traditional seat pedestal with an air bag where it is necessary to adjust pressure to lower the height of the pedestal, a short and heavy individual may potentially bottom out the seat pedestal. The ability to selectively lower the maximum height in the seat pedestal, independent of the pressure in the air bag, would provide more flexibility to accommodate various users of the seat pedestal than presently available.

SUMMARY OF THE INVENTION

The present invention is an adjustable seat pedestal that is used to cushion the ride of an occupant of a vehicle. The pedestal has a top carrier on which a seat is mounted. A base is mounted to the floor of the vehicle. The first linkage, having a lower end and an upper end, is pivotally connected to the base at its lower end. The upper end of the first linkage is slidably connected to the top carrier. A second linkage has a lower end and an upper end. The upper end of the second linkage is pivotally connected to the top carrier and the lower end of the second linkage is pivotally connected to a third linkage. The first and second linkages are connected to each other by a pivotal connection that is located intermediate to the end points of each of the first and second linkages. The third linkage has an upper end that is pivotally connected to the lower end of the second linkage. The lower end of the third linkage is pivotally connected to the base. A stop is retained within the top carrier, located inwardly of the upper end of the first linkage. The stop restricts inward sliding movement of the upper end of the first linkage. A spring biases the top carrier upward and away from the base, and this spring may be an air bag that can be selectively pressurized to change the amount of force biasing the carrier upward.

In another aspect of the invention, the stop may be adjustable to change the location at which the upper ends of the first linkage are stopped. This adjustment may be done by having a threaded rod engaging a threaded nut that acts as a stop. The threaded rod may be turned manually or with a motor to facilitate movement of the stop.

DETAILED DESCRIPTION OF INVENTION

Figure 1:
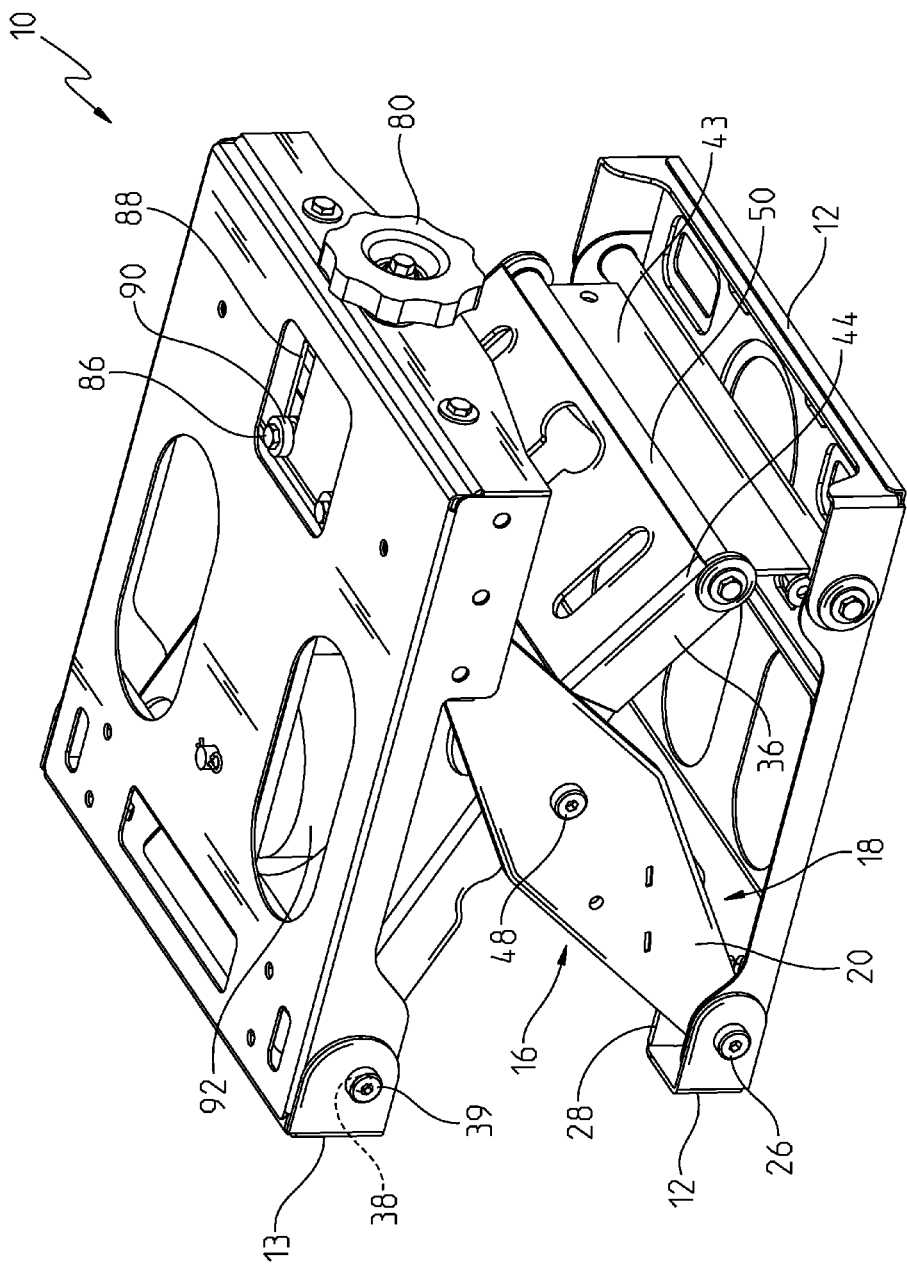
FIG. 1 is a perspective view, of the seat pedestal.
Figure 2:
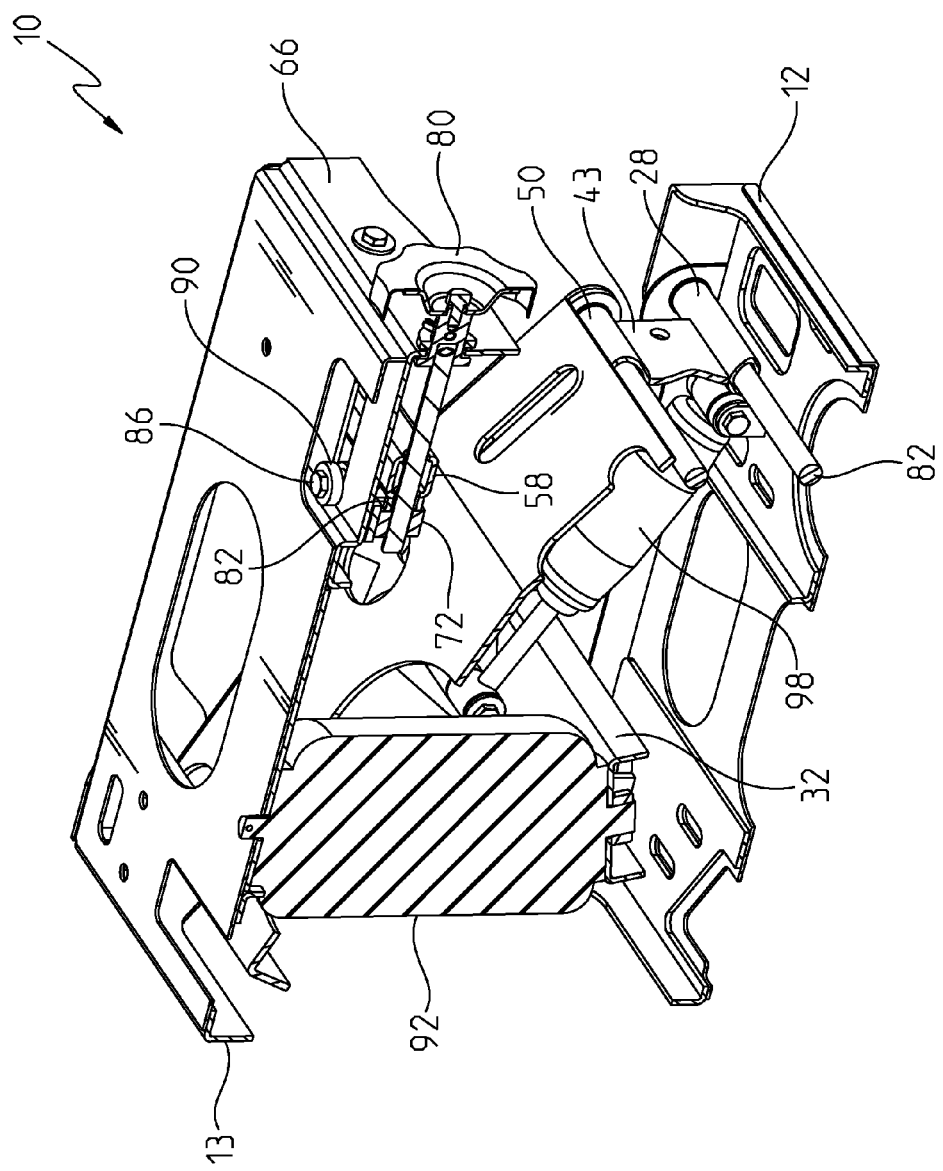
FIG. 2 is a sectional view taken about line 2-2 in FIG. 1 showing the seat pedestal with the air bag pushing the seat pedestal to its maximum available height and pushing the carriage against the threaded nut stop, which is in its most inward position.
Figure 10:
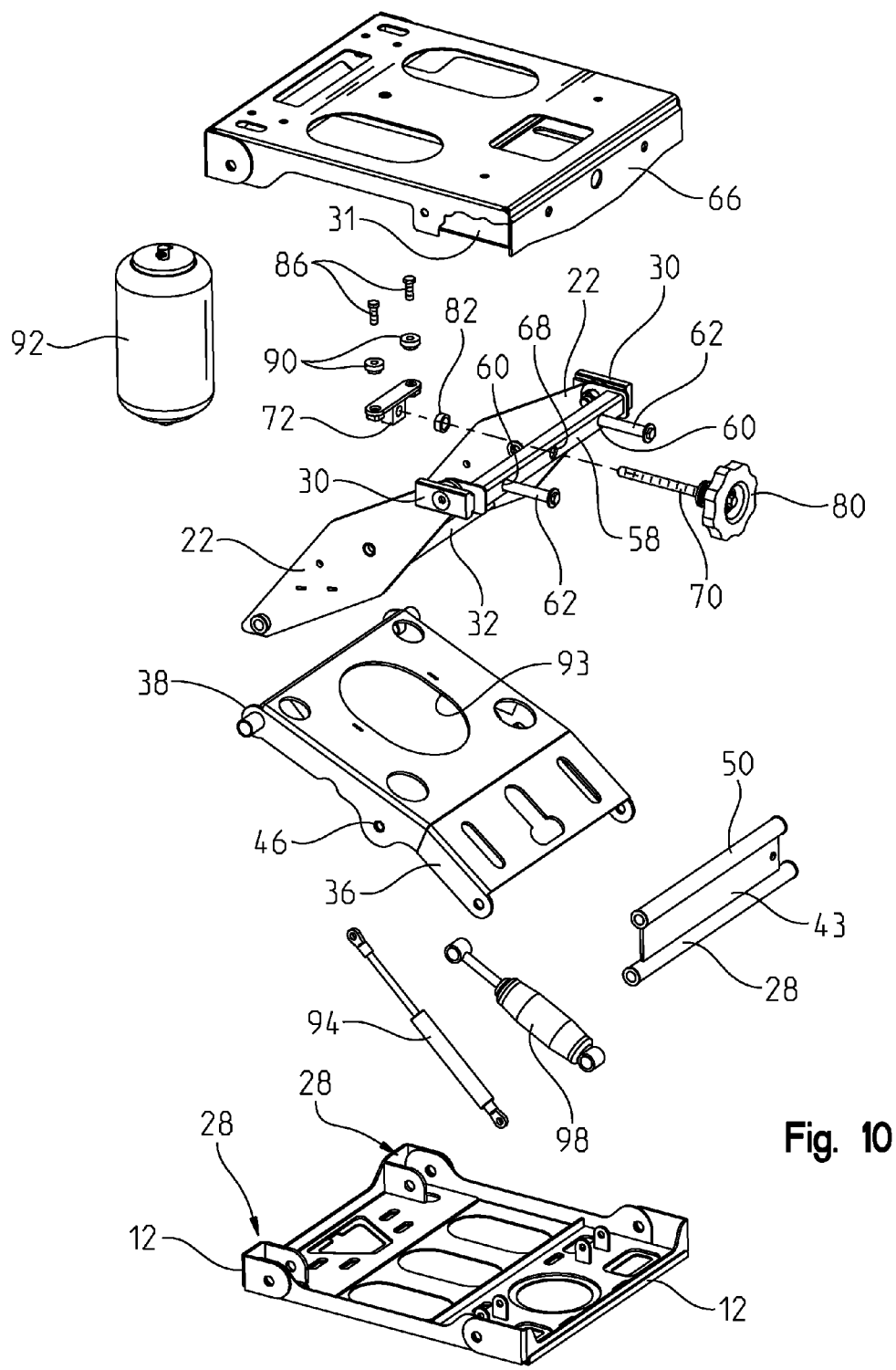
FIG. 10 is an exploded perspective of the seat pedestal shown in FIGS. 1-9.

The seat pedestal 10 of the present invention is designed to provide a cushioned ride for an occupant of a vehicle in which the pedestal 10 is installed. The pedestal 10 has a base 12 that is made to be fixed to a floor of the vehicle. Typically, this is bolted to the floor of the vehicle. A top carrier 13 is supported above the base 12 with a scissor linkage 16. The carrier 13 is designed to have a seat affixed to it and this is usually done with bolts so that a user of the pedestal can choose a particular seat. The scissor linkage 16 has a first linkage 18 that has a pair of opposing arms 20 that are the same length. The first linkage 18 has an upper end 22 and a lower end 24. At the lower end 24 of the first linkage 18, each arm 20 has a pivotal connection to the base 12. This connection is done with a bolt 26 held in a clevis 28 on the rearward end of the base 12, as shown in FIGS. 1 and 10. The upper end 22 of the first linkage 18 has sliding blocks 30 that are pivotally attached to the upper ends 22 of each arm 20. The arms 20 are joined together with a cross member 32. The sliding blocks 30 are T-shaped and are adapted for riding in a C-channel 31.

A second linkage 36 of the scissor linkage 16 has an upper end 38 and a lower end 44. The upper end 38 is pivotally connected to the carrier 13 with bolt 39. The lower end 44 is pivotally connected to a third linkage 43. Between the upper end 38 and lower end 44 of the second linkage 36, it is pivotally connected to the first linkage 18. The second linkage 36 pivots about apertures 46 when it is connected to the first linkage 18. Bolt 48 pivotally connects the first and second linkages 18, 36. Apertures 46 are located on opposite sides of the second linkage 42 and each receive a bolt 48. The third linkage 43 has its upper end 50 pivotally connected to the lower end 44 of the second linkage 36. A lower end 54 of the third linkage is pivotally connected to a forward end of the base 12.

A carriage 58 is pivotally connected to the first linkage 18 and spans across to each upper end 22 of each arm 20. The carriage 58 is connected inside the arms 20, opposite the sliding blocks 30. The carriage 58 has guide holes 60 that are adapted for receiving guide rods 62 that are affixed to a forward flange 66 of the top carrier 13. A central hole 68 has an inner diameter that is larger than a threaded rod 70 that passes through the carriage 58. The carriage 58 moves as the first linkage 18 moves relative to the top carrier 13. This movement occurs when the top carrier 13 moves nearer or farther from the base 12. The threaded rod 70 is longitudinally fixed to the forward flange 66 and is rotatable within the flange 66.

Figure 3:
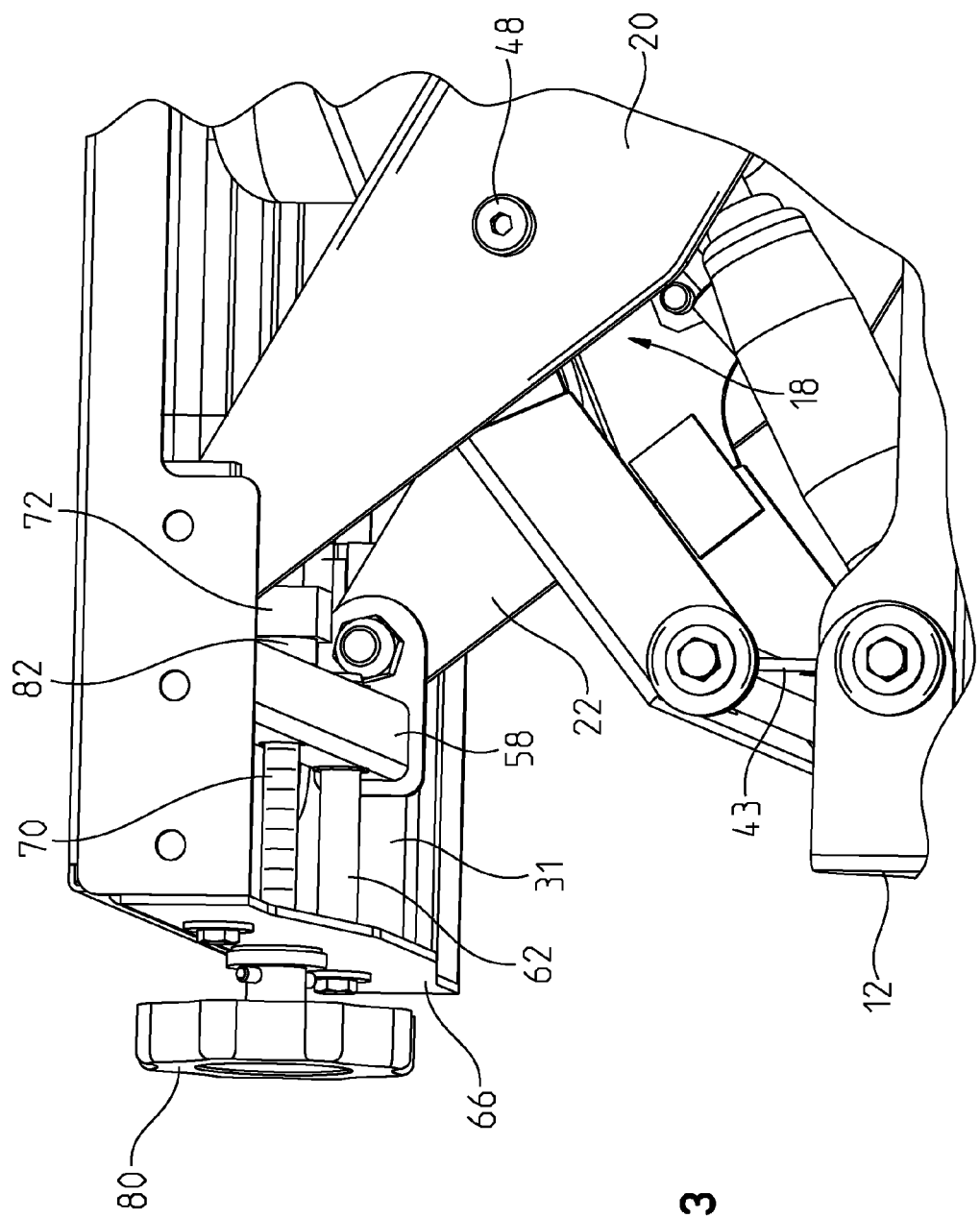
FIG. 3 is a close up perspective view of the seat pedestal shown FIG. 2 in the same position with the air bag pushing carriage against the threaded nut.

The treaded threaded rod 70 is connected to a threaded nut 72 that acts as a stop. The threaded nut 72 limits the inward travel of the carriage 58, and thus limits the inward movement of the upper ends 22 of the arms, and sliding blocks 30. A knob 80 attached to the threaded rod 70 may be used to rotate the rod 70 and move the location of the threaded nut 72. As shown in FIG. 3, the upper ends 22, and carriage 58 are in their most inwardly available position due to being stopped by the nut 72. A rubber washer 82 is located adjacent to nut 72 to prevent metal to metal contact as the carriage 58 is stopped by the nut 72. Rotating the knob 80 moves the nut 72 and changes the maximum inward position of the upper ends 22. The nut 72 has bolts 86 extending upward from it that ride in slots 88 in the carrier 13. Plastic washers 90 on the bolts 86 provide a low friction connection to the carrier 13 so the nut 72 may slide relatively easily relative to the carrier 13 when the adjustment knob 80 is turned.

An air bag 92 acts as a spring urging the carrier 13 away from the base 12. The bag 92 is attached to the cross member 32 and to the carrier 13. The air bag 92 extends through an aperture 93 in the second linkage 36. The bag 92 may be selectively filled to a desired pressure that will correspond to a larger force urging the carrier upward with higher pressure, and a lower force urging the carrier upward with lower pressure. A gas spring 94 may be added to urge the second 36 linkage upward, and therefore urge the carrier upward. The gas spring 94 will provide a more constant force over its change in length than either an air bag 92 or a conventional coil spring. Its position is shown in FIG. 10, but it is not necessary to have the gas spring 94 because the air bag 92 can provide sufficient force to support the carrier 13 and an occupant seated on a seat mounted to the carrier 13. A damper 98 is connected to the first linkage 18 to provide damping of movement during travel of the vehicle. Excessive movement would cause irritating bouncing for a user of the seat attached to the pedestal 10.

Weight or force exerted upon the carrier 13 through a seat that is attached to it will cause movement within the scissor linkage 16 in a controlled manner. Force exerted downwardly on the carrier will move the upper ends 22 of the first linkage 18 away from the upper ends 38 of the second linkage 36. This will cause the carriage 58 to slide smoothly along its guide rods 62 as well as cause the slide blocks 30 to slide within their respective C-channels 31. Downward movement of the carrier 13 toward the base 12 will also cause the lower ends 44, 24 of the second linkage 36 and first linkage 18 respectively to move apart. Since the lower end 24 of the first linkage 18 is pivotally attached to the base 12 it cannot move laterally, it is the lower end 44 of the second linkage 36 that pivotally moves with the upper end 50 of the third linkage 43 to facilitate lateral movement. It is this accurate movement that allows the lower ends 44, 24 to move apart laterally as necessary to facilitate near parallel movement of the carrier 13 relative to the base 12. During this movement the nut 72 remains in its position and it is the carriage 58 that moves away from the nut 72. The guide rods 62 and slide blocks 30 provide a complementary guidance to the upper ends 22 so that binding does not occur due to parts camming into each other. The fact that all of the other connections in the scissor linkage 16 other than slide blocks 30 are pivotal allows the forward most edge 63 of the base to be located rearward of where it otherwise would be if sliding connections were used at both forward most connections on the carrier 13 and base 12.

Figure 4:
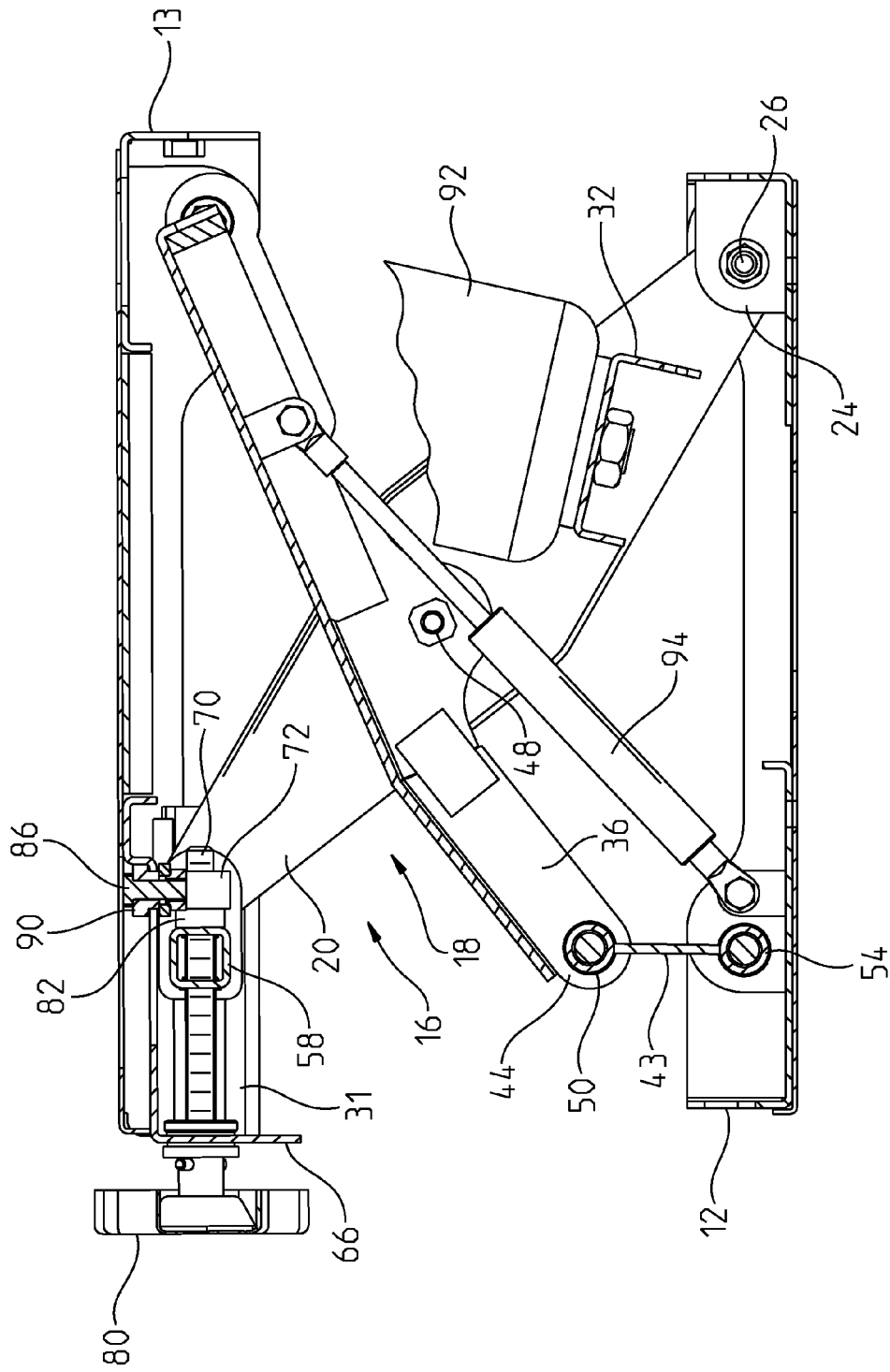
FIG. 4 is a sectional view showing the same position of the seat pedestal as that shown in FIG. 3.
Figure 5:
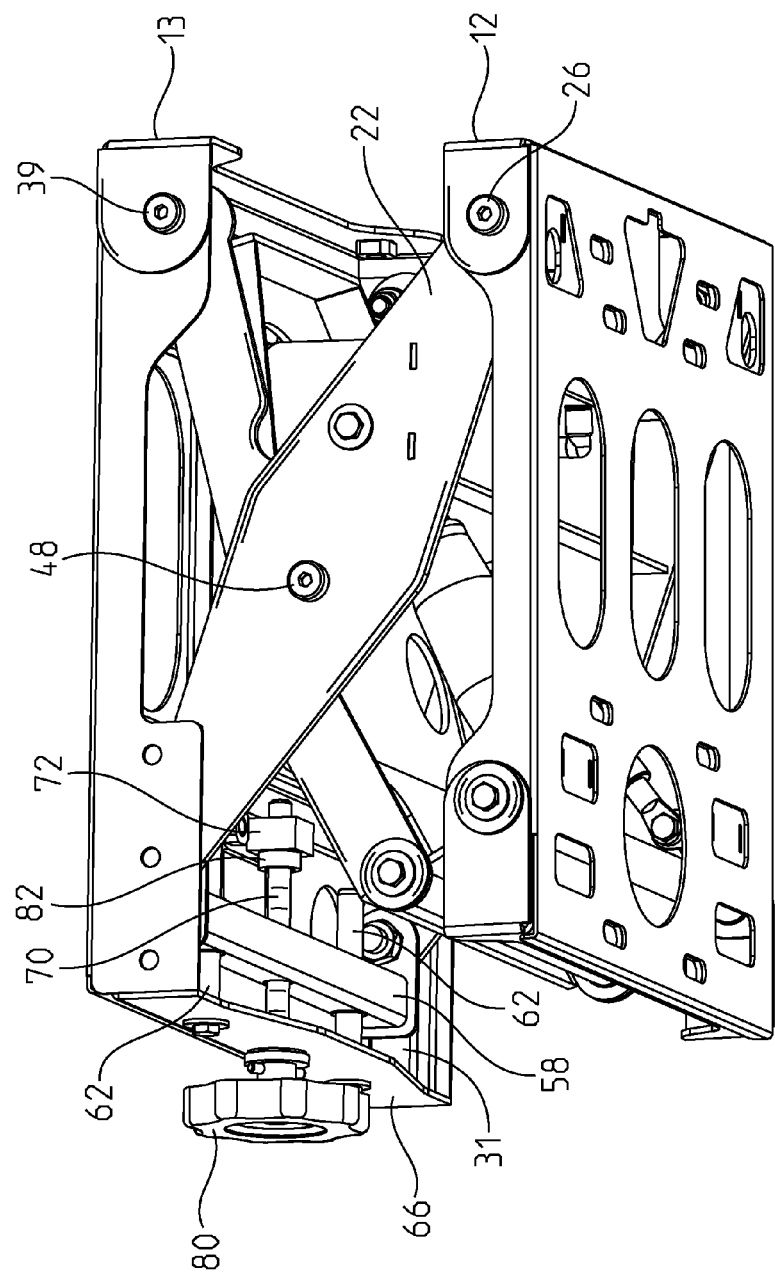
FIG. 5 is a close up perspective view like that of FIG. 3 with the top carrier moved downward toward the base so the carriage is outward away from the threaded nut.
Figure 6:
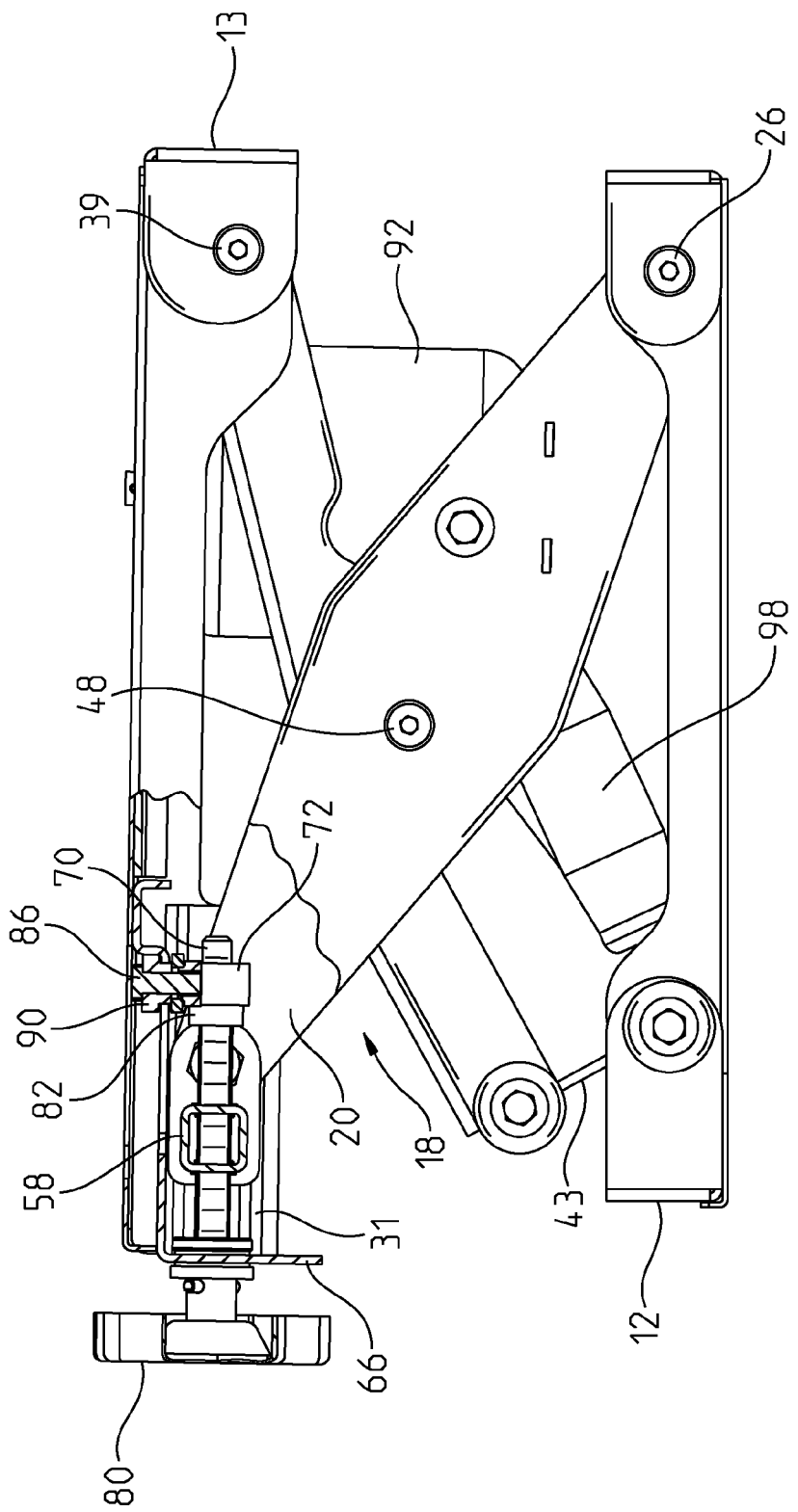
FIG. 6 is a sectional view of the seat pedestal showing the same position as that in FIG. 5.
Figure 7:
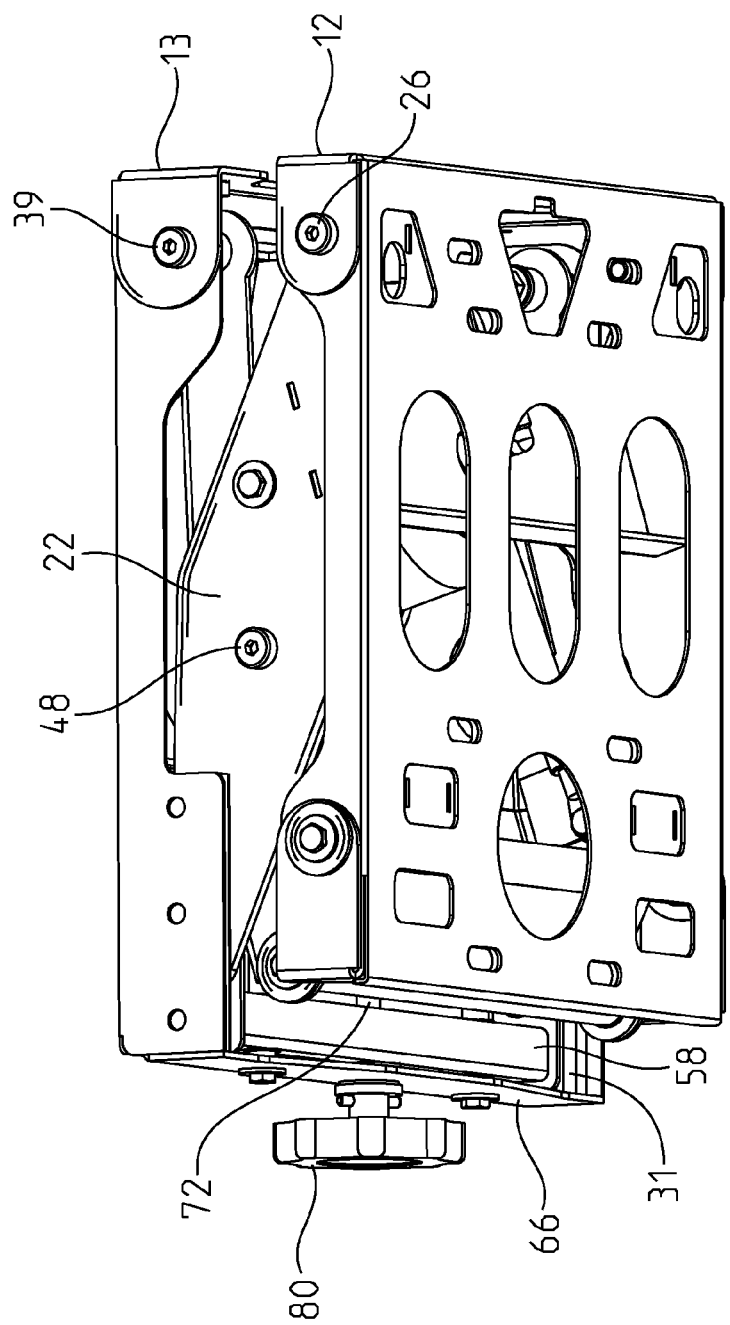
FIG. 7 is a close up perspective with the top carrier moved downward to its lower limit showing the carriage moved further away from the threaded nut than the position shown in FIGS. 5 and 6.
Figure 8:
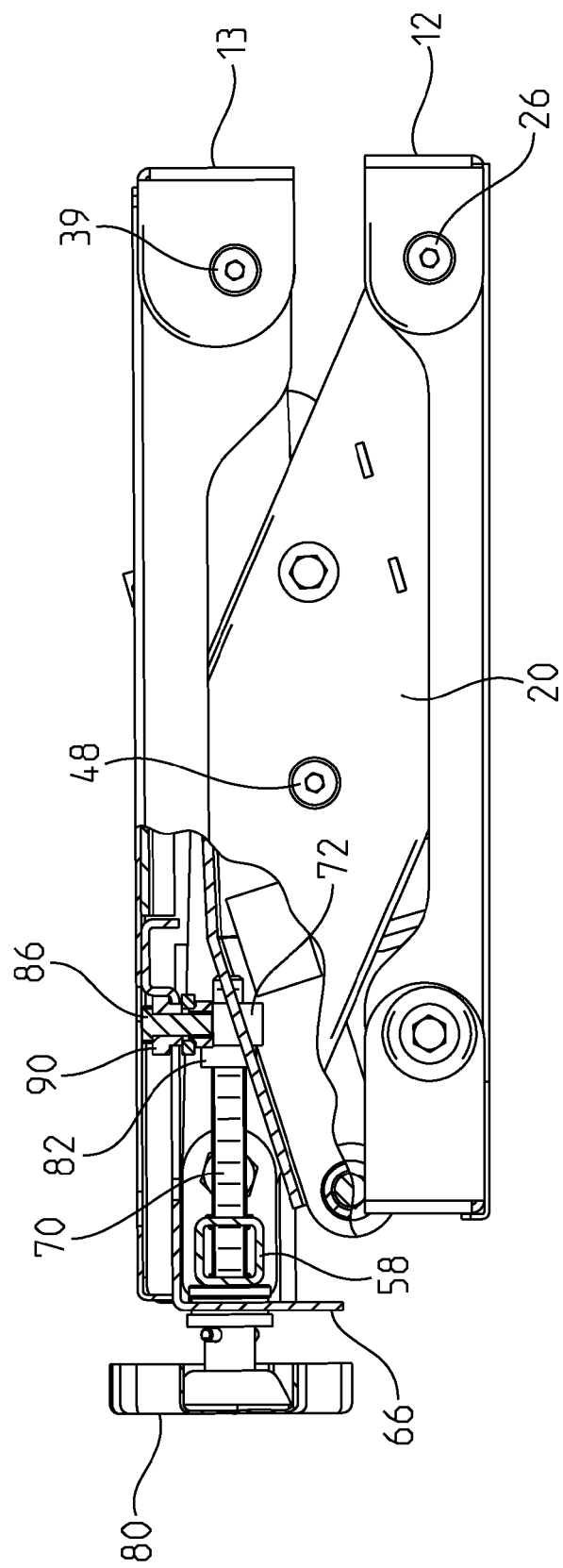
FIG. 8 is sectional view showing the same position as that shown in FIG. 7.
Figure 9:
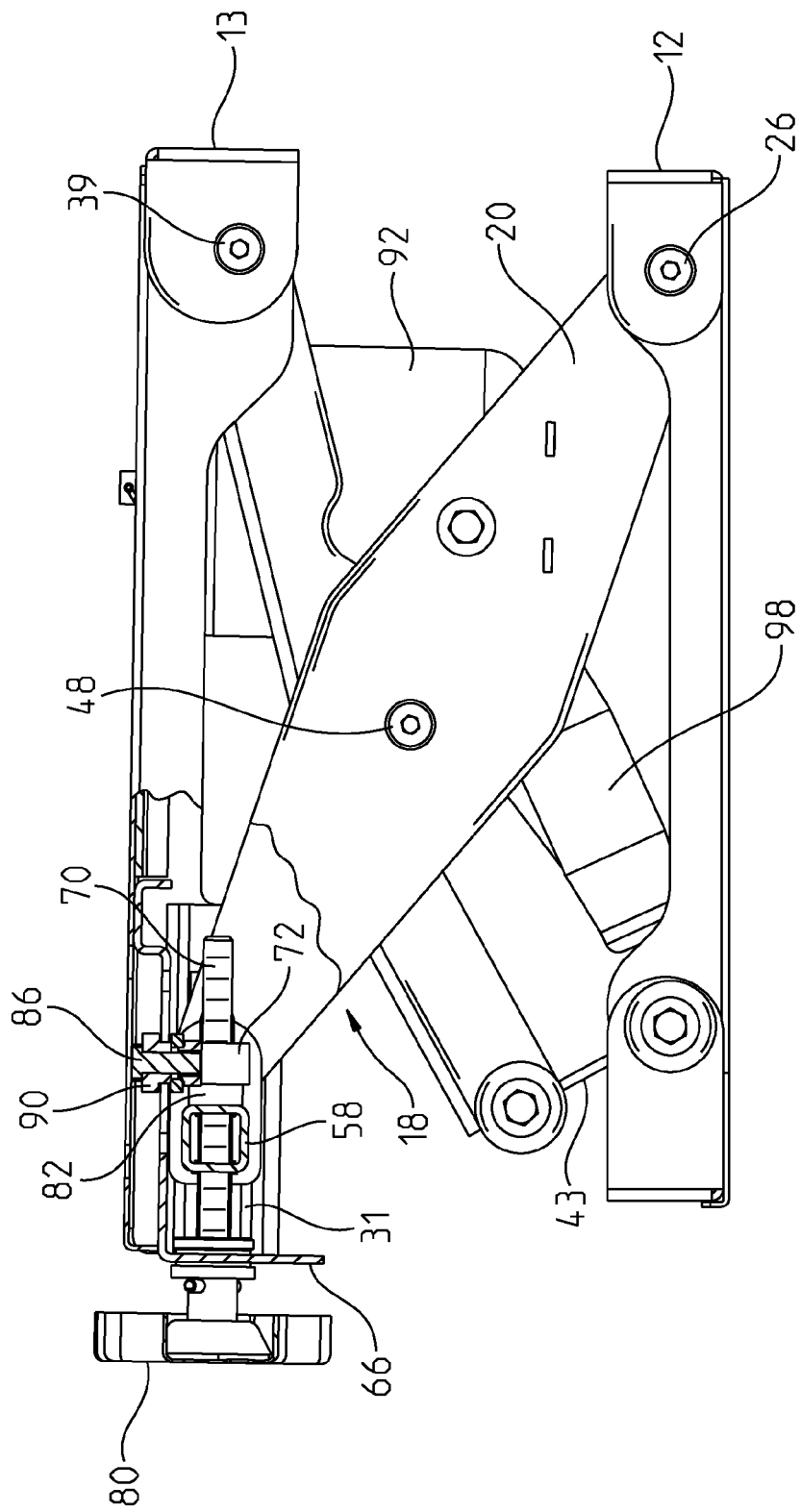
FIG. 9 is a sectional view showing the threaded nut adjusted to limit the maximum height of the top carrier above the base to a lower height than that shown in FIGS. 1-8.

FIG. 3 shows the carrier 13 at its maximum height above the base 12. This corresponds the bolts 86 being moved to their maximum inward positions within the slots 88. The carriage rests against the rubber washer 82 which is stopped against the threaded nut 72. FIG. 4 is a sectional view of this same position. In the position shown in FIGS. 3 and 4, the air bag 92 has fully biased the carrier 13 upward. FIGS. 5 and 6 illustrate what will happen when force is put on the carrier 13 that is sufficient to overcome the biasing force of the air bag 92. This force can come from the weight of the occupant or could be the intermittent force from the occupant resulting from the vehicle hitting a bump. The carriage 58 is connected to the upper ends and will move outward with the upper ends 22 and away from the threaded nut 72 when the carrier 13 is forced downward. The carriage 58 may be forced downward until it reaches the forward flange 66, which stops further outward movement and defines the lowest possible height the carrier 13 will be above the base 12. FIGS. 7 and 8 show the lowest possible height of the pedestal. The difference between the height of the carrier 13 in FIGS. 3, 4 and FIGS. 7,8 is the maximum travel of the seat pedestal. FIG. 9 shows threaded nut 72 being adjusted outwardly or more near the forward flange 66 than in FIGS. 3-8. This limits the maximum height that the carrier 13 may be above the base 12 to a lower height than that of FIGS. 3-8. Downward force on the carrier 13 will move the carriage 58 away from the threaded nut 72 in the same fashion as that which occurs in FIGS. 3-8, but the overall range will be less than that of FIGS. 3-8.

In use, the pedestal 10 offers a great amount of adjustability to choose desired ride characteristics without changing the pedestal 10 itself. The full height of the carrier 13 above the base, or the seat height is determined by adjusting the adjustment knob 80 to move the nut 72. This adjustment may be manually done through the use of a knob 80, or could potentially be done by the use of a motor. FIGS. 3 and 4 show the seat at full height with no weight upon the seat. This position could also be the position in which too little weight is put upon the seat and carrier 13 to push the carrier 13 downward. In this configuration, the air bag 92 pushes upwardly on the carrier 13 and thus moves the sliding upper ends 22 of arms 20 inward toward the center of the carrier 13. The ends 22 are connected to the carriage 58 so the carriage 58 moves inwardly with the ends 22 and the nut 72 limits the inward movement of the carriage 58. The nut 72 will prevent inward movement of the carriage 58 no matter what pressure is put into the air bag 92. If a vehicle occupant wishes to have a hard ride in which it would take a great deal of force to push the seat and carrier 13 downward, more air pressure will be put into the bag 92. FIGS. 5 and 6 correspond to a position where enough weight or force has been placed upon the carrier 13 so that the carrier 13 has been forced downward toward the base 12. As can be seen in FIGS. 5 and 6, the nut 72 is located in the same position relative to the forward flange 66 as it was in FIGS. 3 and 4, but the carriage 58 has moved outward relative to the nut 72. This movement will occur when the vehicle hits a bump and the carrier 13 moves to cushion the occupant. The maximum amount the carrier 13 can move downward is until the carriage 58 is stopped against the forward flange 66, and this may never happen if the air bag 92 is pumped with air of sufficient pressure. If the air bag 92 is pumped with a great amount of pressure, the force required to move the carrier 13 downward and the carriage 58 outward may be so high that under ordinary circumstances during vehicle travel, the carrier 13 and seat attached to it do not move downward. This would correspond to an extremely hard ride setting.

The pedestal 10 of the present invention allows adjustment not possible with just an air bag. In the prior art, simply using an air bag for more height required more air pressure. Lower height required less air pressure. This would mean a shorter vehicle occupant, who would use a traditional seat, would have to tolerate a softer ride because the low pressure in the air bag would provide that. In the case of the present invention, a shorter occupant who would like a harder ride could adjust the nut 72 into a position corresponding to a relatively near distance to the forward flange 66 and then he could pressurize the air bag 92 to a high level of pressure for a firm ride at low height. This could also be a benefit to a shorter heavier user of the seat because with the present invention the higher pressure in the air bag 92 could prevent bottoming out. In the past, high pressure might put the pedals out of reach for a shorter individual. As such, the present invention makes it possible to accommodate different weight and sized people to an extent that was not possible before without having to change out the seat pedestal 10 itself.

The present invention is not limited to the details given above, but may be modified within the scope of the following claims.

What is claimed is:

1. A seat pedestal for a vehicle to cushion the ride of an occupant, said seat pedestal comprising:
   a base;
   a top carrier, adapted for having a seat mounted thereon;
   a first linkage having a lower end and an upper end, said lower end of said first linkage being pivotally connected to said base, said upper end of said first linkage slidably connected to said top carrier;
   a second linkage having a lower end and an upper end, said second linkage having a pivotal connection to said first linkage, said pivotal connection being intermediate to said upper and lower ends of said first linkage and intermediate to said upper and lower ends of said second linkage; said upper end of said second linkage pivotally connected to said top carrier;
   a third linkage having an upper end and a lower end, said upper end of said third linkage pivotally connected to said lower end of said second linkage, said lower end of said third linkage pivotally connected to said base;
   a stop being retained within said top carrier and located inwardly of said upper end of said first linkage said stop restricting inward sliding movement of said upper end of said first linkage; and
   a spring urging said top carrier upward relative to said base and biasing said upper end of said first linkage inwardly.

2. A seat pedestal as claimed in claim 1, wherein said stop is adjustable in position relative to said top carrier.

3. A seat pedestal as claimed in claim 2, wherein said stop is a threaded nut engaging threads on a threaded rod, said threaded rod longitudinally fixed relative to said top carrier and rotatable to said top carrier so that rotation of said threaded rod moves said threaded nut relative to said top carrier.

4. A seat pedestal as claimed in claim 3, wherein said first linkage has a pair of opposing arms, the upper end of each arm being slidingly retained within said top carrier, a carriage spanning said upper ends of said arms and pivotally joined thereto so that said carriage moves with said upper end of said linkage.

5. A seat pedestal as claimed in claim 4, wherein said threaded nut restricts inward movement of said carriage.

6. A seat pedestal as claimed in claim 5, wherein said spring is an air bag.

7. A seat pedestal as claimed in claim 6, wherein a cross member is joined to each arm of said first linkage said cross member supporting said air bag being connected to said cross member and said top carrier.

* * * * *